Figure 1:
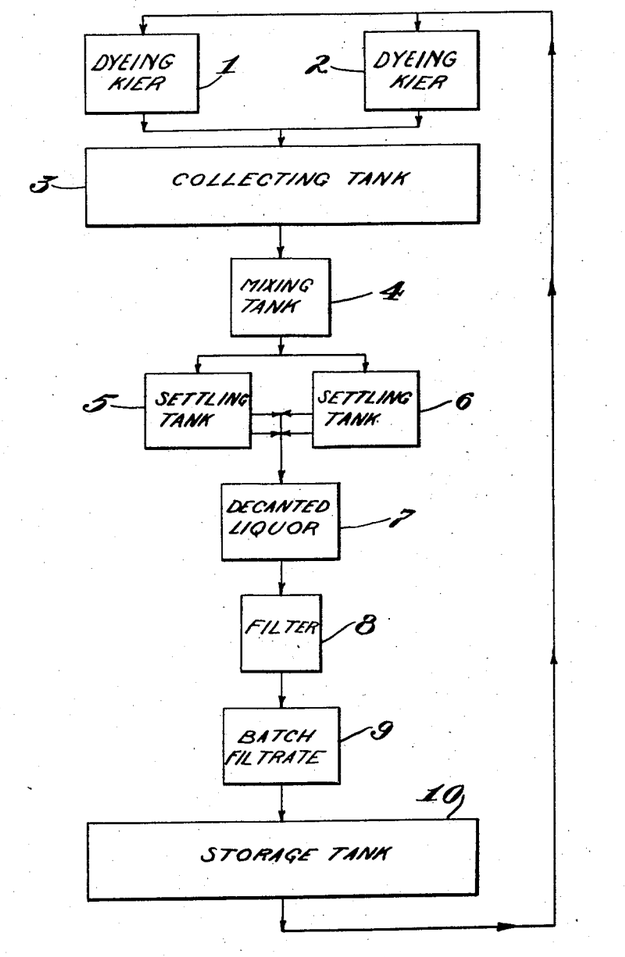

July 20, 1948.  L. C. GALATIOTO  2,445,323
METHOD OF RECOVERING SPENT DYE LIQUORS BY
TREATMENT WITH ACTIVATED CARBON AND
PRODUCT THEREOF
Filed July 21, 1947

Inventor
Luigi C. Galatioto
By Pitts, Cushman & Grover
Attys.

Patented July 20, 1948

2,445,323

UNITED STATES PATENT OFFICE 2,445,323

METHOD OF RECOVERING SPENT DYE LIQUORS BY TREATMENT WITH ACTIVATED CARBON AND PRODUCT THEREOF

Luigi C. Galatioto, Providence, R. I., assignor to Textron, Incorporated, New York, N. Y., a corporation of Rhode Island Application July 21, 1947, Serial No. 762,482

25 Claims. (Cl. 210—42.5)

The present invention relates to the recovery of solvents from spent dye liquors, and solutes contained therein.

In the commercial operation of dyeing with various dye liquors, and especially with acid dyes, although a relatively high degree of exhaustion is possible and is actually effected in practice, the spent liquors still contain some dye. Moreover, they contain substantially all of the inorganic and organic reagents with which they were originally prepared. In particular, when employing alcohol solutions of dyes or acidified solutions of dyes having the compositions disclosed in my United States Patent No. 2,249,607, the spent liquors possess considerable value, which should not be lost.

It is not practicable to reuse these liquors, as by the addition of more dye thereto, for it is difficult to ascertain their residual dye content with sufficient accuracy to regulate the resulting dye solution. Moreover, frequent changes of the color, and hence of the dye to be used in the dyeing operation, necessitate the preparation of numerous fresh dye solutions. Obviously a residual liquor containing a dye of one color could not be used in making up a dye solution with a different dye, even though it were of substantially the same color, except in rare instances or where very non-exacting results would be acceptable.

Accordingly, it is a present-day practice of the industry to throw away the spent dye liquors and not only the dye content which they carry but also the inorganic and organic acids and other reagents which they contain. Since these reagents are not at all changed nor seriously affected by the dyeing operation, they are present in just as effective a form as in the original dye liquor, when first prepared, except for dilution and the presence of the residual, unchanged but unwanted dye substance which is left therein from the last dyeing operation.

It is therefore an object of the present invention to provide a simple and economical method for the recovery of these wasted values from spent dye liquors. It is also an object to provide such a method as will be susceptible to practice on a large scale, in simple and inexpensive apparatus. A further object is to recover the reagents in a condition suitable for reuse in the preparation of fresh dye liquors of the same or different colors, without contamination directly or cumulatively even upon successive recoveries of the same reagents forming a part of successively prepared and different dye liquors. Other objects will appear from the following disclosure.

It has been qualitatively observed that dyes are more or less subject to adsorption from their solution. Such observations have led to conclusions that such dyes did not go into molecular solution but rather that they constituted a special state of colloidal dispersions only. These observations have also been explained upon the thesis that even solutes, in truly molecular solution in their solvents, may combine with adsorbent materials and thus be withdrawn from solution, as well as from colloidal solutions or suspensions.

But such theoretical considerations are confronted by the facts that in actual practice many actively adsorbent materials will not adsorb dyes from their solutions, and that many others will manifest only a partial adsorption of the dye, whether it be in true solution or in colloidal suspension. Such results are obviously of no practical value in reclaiming spent dye liquors in a condition which shall be suitable for reuse.

It is now found that the nature and the conditions of a dye in solution and the conditions under which adsorption of the dye therefrom is attempted determine the adsorption which may be and which actually is accomplished, in respect of any given adsorbent material. This is not to say that every adsorbent material may, under suitably adjusted conditions, be employed as an effective or satisfactory adsorbent of dyes from solution. On the contrary, as stated above, many adsorbent materials are not sufficiently active in this direction or not active at all, and in such cases they remain so. In regard to those adsorbent substances which are found to be effective to adsorb dyes from their solution actively, certain conditions are found to be necessary in order to accomplish satisfactory results in actual practical applications of such characteristic properties for the recovery and reuse of the spent dye liquors which are treated therewith.

It is now found that spent dye liquors, of various types, as hereinafter set forth, containing varying amounts of dye in solution or suspension, together with attendant inorganic and organic reagent materials, may be treated, as they come from the dyeing operation, by subjecting them to intimate contact with certain adsorbent surfaces whereby the dye component is selectively and completely combined with the adsorbent reagent (without effect upon the organic or inorganic acids in solution) and that they may be thereby completely removed from the remaining solution, leaving the remaining solutes in solution and in a chemically pure aqueous solution, free from dye.

The materials commonly employed as filtering aids, absorbents or adsorbents, are ineffective for use in the present invention. Activated adsorbent carbon is characterized by manifesting a combined affinity for some dyes in solution. But not all activated carbons are specifically possessed of such combining power. Those which have been found to be active and especially suitable for the purpose are as follows:

"Darco 51"
"Nuchar #2"
"Nuchar C–190–A"
"Cliffchar R–Coarse"

Of these activated carbons: the first is prepared by the carbonization of lignite, by heating to 700–900° C., grinding to sizes of which 70%–90% will pass a 300 mesh screen and then washing with acid and water. The second and third are prepared by the carbonization of the cellulose of paper mill waste liquors, the former without washing, and the latter being washed in acid and water. The fourth is prepared by the carbonization of wood, without washing.

The second and third activated carbons or Nuchars above mentioned are prepared generally in accordance with the United States patent to Naugle, No. 1,701,272, by carbonizing the cooking liquors derived from the treatment of wood by the alkali process to obtain wood pulp. The carbonized lignin residue is heated to expel volatile substances and to fuse the mineral substances present therein, which fused mineral substances are removed.

The product Nuchar has been made and sold for many years, and is described as the black ash residue obtained from paper mills. According to the manufacturers, Nuchar #2 differs from C–190–A in that the Nuchar #2 has a lower degree of activation with no purification whatever, while Nuchar C—190—A has been purified and activated to a high degree.

The third of the adsorbent carbons above mentioned, namely, Cliffchar R–Coarse has been manufactured and sold for many years and is prepared in accordance with United States Patents Nos. 2,003,277 and 2,003,278, granted to Olson. This product is made from charcoal produced in any suitable manner as by heating wood below 1000° F. The wood is granulated, graded and cleaned of dust. Then the granular material is heated to drive off included volatiles in the presence of steam by passing the granules between the electrodes of an electric furnace. According to the patents, the charcoal granules are heated from 3000 to 3300° F. while moving at a speed of ½ inch to 12 inches per hour past the electrodes in the presence of 1 to 5 pounds of steam.

With such specific activated carbons, the procedure is to effect intimate and complete contact of spent dye liquors, as they come from the dyeing operation (or supplementarily acidified as the case may be) with a sufficient amount of the activated carbon and for a sufficient time to effect such contact and to complete the combination of the carbon with all of the dye substance present in the batch of spent dye liquor under treatment.

While elevated temperatures promote such combination, and thus reduce the amount of activated carbon necessary and shorten the time required, increased temperature should be employed with care unless the equipment used is strongly chemical-resistant. Otherwise serious corrosion may occur, especially when the liquors contain free acids. At slightly lowered temperatures such corrosive action may be prevented and ordinarily at the usual temperatures of the dye bath no appreciable corrosion or attack of the equipment is involved during the short period of time required, for the recovery treatment. Moreover, it is usually cheaper to use more carbon and thus to avoid temperature increase.

The period of time required to effect complete contact treatment and combination of the dye with the activated carbon may vary somewhat. But in general it may be said that, in substantially large commercial batches, about 40 minutes of agitation of the dye liquor, after adding and dispersing uniformly the required amount of activated carbon therein, is sufficient to effect complete contact and combination, so that the carbon, upon removal from the liquor, will take all of the dye with it and leave a perfectly clear, colorless, aqueous solution of the inorganic and organic reagents, free from dye substance whether dissolved or suspended therein.

A typical example of the practical carrying out of the invention will be described with reference to the residual acid dye liquors, obtained from the dyeing operation described in my patent referred to above.

In the conduct of the process apparatus will be required as indicated in the accompanying diagram or flow sheet, the tanks being made of wood or acid-resistant metals, glass, synthetic resins, etc., and the pumps and pipe lines being suitably coated or lined to protect them also, in any of the various ways now known in the industry for this purpose.

Thus, it will be convenient to operate with two or more dyeing kiers, such as those shown at 1 and 2 in the drawing, in each of which separate dyeing operations may be conducted. As the dyeing operation is completed in each kier the spent liquor is drawn or pumped therefrom into the collecting tank 3.

In the event that it should be desired and considered practical to recover the dye content of the liquor for reuse, it would not be practicable to run different dye liquors in admixture into the tank 3. But since the amount of dye in the spent liquors is not usually sufficiently great or sufficiently valuable to warrant attempting its recovery it is really economical and is found to be feasible to run various spent liquors containing different dyes, and at different concentrations of such dyes and different concentrations of acids and other reagents, together, into the common collecting tank 3, so long as admixture of such reagents is not opposed to their value upon recovery. It is also found to be perfectly practicable and completely effective to apply the process of the invention to the resulting mixture of spent dye liquors and to obtain a convenient and at the same time satisfactory treatment, an efficient recovery and a completely clear water-white solution of the inorganic and organic acids, or other reagents present, without a trace of dye therein.

The mixed spent dye liquor may therefore be run in batches from the collecting tank 3 to the mixing tank 4 where the finely divided activated carbon is poured in, while the liquor is agitated in any suitable way, as by a mechanically operated mechanical stirrer or propeller blades mounted therein (made of chemically resistant materials) which may be of any common commercial type and hence are not shown in the drawings. After the activated carbon has been added and thoroughly mixed with the liquor the agitation of the entire batch is continued for 20 to 40 minutes. For an average mixture of commercial spent acid dye liquors it is found that about 16 lbs. of Nuchar C-190-A is sufficient to treat 500 gallons of the liquor. When sufficient activated carbon has been added it is found that 40 minutes of active agitation of the batch under treatment is sufficient with substantially all dyes and under all usual condtiions of treatment.

The batch is then run alternately into the settling tank 5 or into settling tank 6, and allowed to stand quiescent therein until the activated charcoal, which contains all of the dye substance from the charge in combination therewith, settles to the bottom, under gravity. The supernatant liquor, which consists essentially of a clear, transparent water-white aqueous solution of the inorganic and organic acids, and other reagents, if present, is then decanted from the activated carbon (which accumulates and remains at the bottom) into a collecting tank 7, for the thus decanted liquors. This decanted clear solution contains a small amount of activated carbon mixed with it. It is therefore carefully filtered through a porous filter medium such as paper disks, under moderate pressures. This may be conducted continuously, up to the point of excessive cake formation, as through a filter of one of the usual commercial types, such as the enclosed ring type, as indicated at 8, and thence to a collecting tank 9 and finally to a storage tank 10.

In the storage tank 10 the recovered clear aqueous solution of inorganic and organic reagents is suitable and ready for reuse in making up fresh lots of dye liquors. Frequently this may be done directly, without adjustment of any kind, or after the addition of those volatile acids which may have been lost by evaporation, such as formic and acetic acids, in spent dye liquors which have been prepared and used in accordance with my patent disclosure referred to above. Non-volatile acids, which have been reduced in their effective concentrations in the solution by dilution, as in the course of washing the liquor from the pumps and from the containers or from the activated carbon with water, may also be added at this stage in amounts required to bring the recovered reagent solution up to the desired strength in respect of these acids.

In certain acid dye liquors, such as those prepared in accordance with my patent above mentioned, a typical acid dye liquor may contain 8.33% of 84% acetic acid, 8.33% of 85% formic acid and 8.33% of 20° Bé. (23% acid) sulphuric acid.

The ratio of the dye liquor to the goods dyed in the dyeing operation or "liquor ratio" will, of course, affect the concentration of the dyeing solution which is left after the dyeing operation. This in turn will affect the amount of activated carbon required to combine with and effectively and completely remove the dye therefrom. In a wide range of commercial acid dye liquors and of the operations therewith, it was found that from .3% to 6.0% of activated carbon upon the weight of the charge of dye liquor being treated was in all cases sufficient to accomplish satisfactory results, by the procedure as above described, in a single treatment.

Tables giving the results with each of the adsorbent materials above disclosed with various dye solutions are appended hereto.

Table I of results obtained with each of the four types of activated carbon above mentioned, upon spent dye liquors and mixed dye liquors, used at various liquor ratios in dyeing, showing the percentage of dyestuff removed by the treatment.

Table II of results obtained with solutions of acid dyes prepared in water solution and in accordance with United States Patent No. 2,249,607.

Table III of results with solutions of acid dyes (similar to those in Table II) showing effects of additions of acetic or sulphuric acid upon the amounts of activated carbon required for complete dye removal.

Table IV of results obtained with aqueous solutions of direct dyes showing the effects of varying amounts of acid (acetic or sulphuric) and of activated carbon, the time required for filtration and the degree of removal of dye substance therefrom.

Table V of results obtained with aqueous solutions of direct acetate dyes with and without acidification, with acetic and sulphuric acids, and the effects upon the time required for filtration and the degree of removal of dye substance therefrom.

Table VI of results obtained with alcohol (85%) solutions of Artol dyes as used for dyeing cellulose acetate, showing the amount of activated carbon required and the time required for filtration, and the degree of removal of dye substance therefrom.

Table VII of results obtained with exhausted solutions of vat dyes, the amount of activated carbon required, time of filtration and degree of removal of the dye substance therefrom.

Table VIII of the results obtained with solutions of basic dyes, the amount of activated carbon required, the time required for filtration and the degree of removal of the dye substance therefrom.

Table IX of the results obtained with solutions of sulphur dyes, the amount of activated carbon required, the time required for filtration, and the degree of removal of the dye substance therefrom.

Table X of the results obtained with solutions of naphthol dyes, rinsings and coupling baths, the amounts of activated carbon required, the time required for filtration, and the degree of removal of the dye substance therefrom.

The results given in Table I show that each of the four activated carbons employed is effective not only to clarify and completely remove the dye content of various dye liquors of varying concentrations, as obtained from dyeing operations conducted at various liquor ratios, but that a small amount of carbon is adequate in each case and that an overall period of treatment of 40 minutes is sufficient. They show that mixtures of dye solutions may also be effectively treated and completely liberated of dye substance, whether a long or short liquor ratio has been employed. Hence spent dye liquors may be mixed (and thus save storage space) and then passed through a single recovery process, so long as admixture of the other reagents, which are to be recovered, are not detrimental to each other.

Tables II and III show the amount of the adsorbent required, the time of contact, and the percentage of removal of acid dyes from definitely known dye liquors containing them. It is to be noted that results are given for a number of different dyes with complete elimination of the dye content therefrom, using only a small amount of adsorbent and a short period of treatment.

In all of the acid dye liquors of Tables I and II, the acidity was relatively high, as indicated by their composition and by their manifestation of a pH value of .905 in each case. Such strong acidification of the spent dye liquor, which in these cases was inherent to the preferred method of conducting the dyeing operation, is advantageous to a satisfactory removal of the dye content therefrom by the present recovery method. If the dye liquors, for example, are but slightly acidic or substantially neutral, as when prepared in water solution, the adsorption or absorption of the dye therefrom, while conspicuous in reducing its color and density to a pale or weak dye solution, is not effective to accomplish a sufficient removal of the dye to permit reuse of the residual aqueous solution. Moreover, the adsorption of the dye as thus accomplished from such neutral solutions is variable and not subject to reliable control nor to yield a dependable product of any given concentration of dye therein.

In applying the invention to spent liquors of direct dyes (Table IV) the same procedure may in general be practiced with satisfactory results after preliminary slight acidification of the liquor with an inorganic acid or an organic acid, or both.

It should be mentioned that the recovery of the water content of dye liquors is itself an important desideratum, not only in view of the large quantities necessarily employed, but of the fact that the water supply, in order to be suitable and dependable for use in the preparation of dye liquors and in the dyeing operation, must be of a high order of purity. Natural sources of water of such purity are not easily obtained and when once secured may be sharply limited or subject to seasonal fluctuations, or failure, or to contamination from one cause or another, thus further affecting the available supply.

Accordingly, while the necessary acidification of direct dye liquors may entail an expense, the recovery of the water as well as the recovery of the acid thus employed nevertheless make it an economically desirable procedure in some instances if not in regular practice.

Results obtained with direct dye liquors are set forth in accompanying Table IV, showing the dyes present, the degree of acidification necessary, the amount of adsorbent carbon required, the time of filtration of a given amount (20 c. c.) of the treated liquor through filter paper (Beckman No. 1) under gravity, and the degree of removal of the dye content therefrom.

Thus far in practice it has not been found necessary or expedient to recover either the separated dye or the used adsorbent carbon and hence it has been thrown away. It is contemplated, however, that the recovery and reuse of these materials may prove desirable. In this event, it may be sufficient for the regeneration of the adsorbent material to treat it for reactivation by heating to destroy the adsorbed dye combined therewith, or to treat it with strong acid solution or other more active solvent, to overcome such combination of the dye and effect its removal from the carbon. The dye, when present in sufficiently large or valuable amounts, may be removed by selective solvent action of powerful solvents sufficient to dissolve or chemically combine with the dye and thus overcome its combination with the adsorbent surface, which is of a physical or quasi-chemical character. In such cases the adsorbent may subsequently be revivified by reactivating in known ways.

Direct acetate dyestuffs also lend themselves to complete and ready removal from liquors containing them, as shown by the results set forth in Table V. Acidification, as with acetic or sulphuric acid, is helpful in effecting complete removal of the dye. The addition of the acetic, but still more the addition of sulphuric acid, promotes the filtration of these treated dye liquors.

When the dye liquor is prepared with alcohol it is obvious that the alcohol content of the spent dye liquor is especially valuable and that its recovery is of greater importance accordingly. As shown in Table VI, it is found that such dye liquors may be effectively treated in accordance with the present invention, for the complete removal of the dye substance therefrom, leaving the completely clarified alcohol solvent suitable for reuse as such. These alcohol dyes, known as "Artol Colors" are sold in concentrated form to be effective in the alcohol method for dyeing cellulose acetate.

It is further found that with the specific adsorbent carbons above described, vat colors (Table VII) may be completely removed from vat dye liquors by treating the same with a sufficient quantity and for a sufficient time of contact, at ordinary temperatures, without preliminary treatment and hence while the liquor contains along with the dye substance, both free caustic alkali and alkali hydrosulphite. Consequently, by removal of the dye substance completely from the dye suspension or solution, these other reagents remain in solution in the clarified dye-free liquor, which is water-white and ready for recovery and reuse in any way desired such as the preparation of a fresh dye liquor of the same or any different color and of any tone required, upon proper adjustment accordingly.

Basic dye liquors also, as shown by Table VIII, are amenable to the application of the process of the present invention with relatively small amounts of activated carbon and are susceptible to prompt filtering action.

It is therefore established that the activated adsorbent carbons above set forth are effective to remove acid dyes, direct dyes for rayon and direct dyes for cellulose acetate, from dye liquors containing them selectively and without effect upon the other organic or inorganic reagents which may be in solution therein, and that they are also effective to remove alcohol-soluble dyes from alcohol solution and vat dyes from vat dye liquors containing them and basic dyes from basic dye liquors, while in solution and without the addition of acids or bases, or of water.

It is also found that solutions of sulphur dyes may be treated in accordance with the invention and the dye substance removed completely. Moreover, the slight addition of an acid to such solutions materially reduces the time required for filtration of the treated liquor, as shown by the results given in Table IX, and also reduces the amount of activated carbon required.

The solutions of naphthol dyes as well as the rinsing and di-azotizing baths in conjunction therewith may be clarified and recovered for reuse, as shown by the results of Table X. The amount of activated carbon required is notably small and the time required for filtration of the treated liquors is also very low, while complete clarification is accomplished.

Typical instances of the practical application of the invention to vat dye liquors and the results obtained are shown in detail in Table VII. In the application of such dyes to yarns, such as rayon yarns, while in package form, the ratio of dye liquor to yarn is usually relatively low. In consequence, concentrated dye liquors may be used, and the spent liquors may be proportionately rather more concentrated than other dye liquors, used with a higher ratio of dye liquor to the goods.

The concentrations of the dye liquors given in this table are therefore relatively high. But this only emphasizes the efficiency of the method herein disclosed, for it will be obvious to those skilled in the art that if the spent liquors to be recovered are more dilute, smaller quantities of the adsorbent will be required and yet be sufficient to effect equally complete removal of the dye substance therefrom, whether in suspension or in solution.

There is, generally, a certain measure of optional procedure, in the practical application of the present process with acid, direct, direct acetate, and sulphur dye liquors, as to the use of more adsorbent carbon, or the addition of acid, or both. The acid appears to accelerate or enhance the adsorptive action of the activated carbon and also to increase its capacity to adsorb and retain the dye substance.

It was apprehended that repeatedly used and recovered dye liquors would manifest an accumulation of Glauber's salt, which is associated with or added to many dyes, and hence would present the addition of accumulative reagent in the course of extensive and repeated operations of dyeing and recovery of the dye liquor. But in actual experience such accumulations of salt are not encountered. It is found that long continued and repeated operations may be conducted with the same solvent, using the same or different dyes and successively treating the spent dye liquor for the removal of the residual dye content therein after each dyeing operation, according to the present invention, and then reusing the treated solvent for the preparation of a fresh dye liquor, treating the spent liquor therefrom, etc. does not produce a dye liquor containing an excess or any serious accumulation of Glauber's salt. It is believed therefor that the Glauber's salt is taken up by the goods or by the adsorbent carbon substantially proportionate to the dye content and hence is each time removed from the solution.

It is notably to be observed from the above disclosed data that the treatment of dye liquors in accordance with the present invention effects a selective combination of dye substance with the activated carbon. Such combination is complete and promotes segregation of the resulting aggregated carbon and dyestuff from the residual solvent and solutes of the dye liquor, and preserves a fast rate and easy filtration thereof. At the same time it is found that the Glauber's salt content of the dye liquor, when present, is not left in the solution but becomes in large part, at least, associated with the activated carbon along with the dye substance. It may be postulated that the Glauber's salt is in combination with the dye substance in its association with the activated carbon or that the dye substance and the Glauber's salt separately associate with the activated carbon, or that the association or combination of the one with the activated carbon promotes the simultaneous combination of the other with the activated carbon. In any event, it is clear that the practical result under the conditions of treatment described and recommended above, is that both the dye substance and the Glauber's salt, when present, combine rapidly, effectively and completely with the finely divided activated carbon and form a dispersed carbon particle mass which is freely, quickly, and completely segregatable and filterable. This effect provides an economical process and a pure solution of the other solutes present, which are thus suitable directly for reuse in the preparation of any fresh dye liquor of the same type, of the same or a different color, and of any combination, shade, or tone which may be required.

The activated carbon, with the associated dye substance thereon, as obtained from a single use, for example, may be used again in some instances for application to other dye liquors, in accordance with the invention and will effect the satisfactory removal of the dye content therefrom. When saturated with adsorbed dye, the carbon of course may not be used again, but may be revivified for reuse as above proposed, or discarded according to the economies of the operations in question.

For such purposes, the activated carbon, containing the adsorbed dye substance, may be sold as an article of commerce and the procedure of recovering the dye and re-activating the carbon may be performed separately from the dye works or dyeing operations. It will contain valuable component materials, namely, the activated carbon, the dye substance, and the Glauber's salt if present. The only reason for throwing it away is that the economy effected by the main process of the invention in respect of the other solute and solvent values of the dye liquors treated, is so great that the value of the dye-saturated carbon, in the relatively small amounts involved, seems inconsequential. Upon suitable accumulations, however, appropriate recovery operations may well be carried out advantageously and result in still further practicable economies and conveniences.

In Table I, following, the percentages of dyes, as given in the several dye liquor formulas, are relative to the weight of yarn dyed therein.

As examples of preparing carbons which are equivalent to the above-mentioned commercial grades, the following procedure may be adopted:

Peat moss, cellulose or lignite may be used. It is mixed with zinc chloride in the proportion of one part of raw material to two parts of zinc chloride and charred, for example, in a 400 c. c., covered iron crucible, over a Bunsen burner for 18 to 20 hours, reaching a temperature of 500–550° C. within two hours, and maintained at such temperature during the remainder of the charring operation, and then allowed to cool in the covered crucible. The char is then ground in a mortar and mixed with 400 c. c. of hot water to dissolve out the zinc chloride, and filtered. The residue is washed with hot water until free from zinc chloride, then dried and ground again until it passes a 325 wire mesh screen.

The carbon may be used in this condition. It may, however, be further activated, as by placing it in a nickel boat, and introducing it through a water-jacketed nickel tube into an electric-resistance muffle furnace, which has already reached a temperature of preferably 950–1010° C. A constant supply of carbon dioxide gas is also introduced into the muffle chamber to displace air and maintain an oxygen free atmosphere to prevent combustion of the carbon. For peat a temperature of 950° C. for 20 minutes is preferred; for cellulose and lignite a temperature of 1000° C. and a period of 45 minutes is very satisfactory. The nickel boat, with its charge of treated carbon, is then withdrawn from the furnace into the water-jacketed nickel tube and allowed to cool for 10 minutes, and then removed and the carbon is kept in a closed container.

By way of comparison of the efficacy of the carbons prepared and treated in accordance with such procedure, the results obtained with the commercial carbons alluded to above, Table XI may be referred to.

Table I

| Dye | Adsorbent Darco S51 | | | | Nuchar #2 | | | |
|---|---|---|---|---|---|---|---|---|
| | Percent by Weight Used | Time of Contact in Minutes | Liquor Ratio | Percent of Dye Removed | Percent by Weight Used | Time of Contact in Minutes | Liquor Ratio | Percent of Dye Removed |
| Chevron Red G-15460 [1] | 1 | 30 | 1:20 | 100 | | | | |
| Navy G-14465 [2] | 1.7 | 40 | 1:7 | 100 | 1.7 | 40 | 1:7 | 100 |
| | 1.0 | 30 | 1:5 | 100 | | | | |
| Bahama G-0262 [3] | 0.8 | 30 | 1:5 | 100 | | | | |
| | .6 | 30 | 1:5 | 100 | | | | |
| | .5 | 30 | 1:5 | 100 | | | | |
| Maroon G-12343 [4] | 1.6 | 40 | 1:5 | 100 | 0.5 | 30 | 1:5 | 100 |
| | | | | | 1.6 | 40 | 1:5 | 100 |
| Purple G-15417 [5] | 0.4 | 40 | 1:20 | 100 | 0.4 | 40 | 1:20 | 100 |
| Chartreuse G-15463 [6] | 0.3 | 40 | 1:20 | 100 | 0.3 | 40 | 1:20 | 100 |
| Brittany Blue G-11360 [7] | 0.3 | 40 | 1:5 | 100 | 0.3 | 40 | 1:5 | 100 |
| Green G-15462 [8] | 0.6 | 30 | 1:20 | 100 | 0.6 | 40 | 1:20 | 100 |
| Green G-15462 and Brittany Blue | 0.4 | 40 | 1:12.5 | 100 | | | | |

[1] Chevron Red G-15460:
  6.0% Azo Rubinole 3GP
  0.05% Wool Fast Blue BLA
  1.5% Supramine Yellow RA
[2] Navy G-14465:
  2.4% Exl. Milling Blue BL conc.
  0.96% Yellow GGA
  0.816 Alizarine Brt. Green GS
[3] Bahama G-0262
  3.0% Wool Fast Blue GLA
  0.44% Wool Fast Blue BLA
  0.30 Alizarine Brt. Green GS

[4] Maroon G-12343:
  3.4% Azo Rubinole 3GP
  1.4% Wool Fast Blue BLA
  1.8% Yellow GGA
Purple G-15467:
  2.6% Azo Rubinole 3GP
  0.48% Wool Fast Blue BLA
[6] Chartreuse G-15463:
  1.5% Supramine Yellow 3GLCF
  0.0225% Wool Fast Blue GLA

[7] Brittany Blue G-13360:
  0.275% Wool Fast Blue GLA
  0.68% Alizarine Brt. Green GS
[8] Green G-15462:
  4.0% Alizarine Brt. Green GS
  1.0% Polar Yellow 5G

Table I-A

| Dye | Nuchar C-190-A | | | | Dye | Cliffchar | | | |
|---|---|---|---|---|---|---|---|---|---|
| | Percent by Weight Used | Time of Contact in Minutes | Liquor Ratio | Percent of Dye Removed | | Percent by Weight Used | Time of Contact in Minutes | Liquor Ratio | Percent of Dye Removed |
| Navy G-14465 | 1.00 | 40 | 1:5 | 100 | 50% Navy G-14465 / 50% Bahama G-0262 | 0.62 | 40 | 1:5 | 100 |
| Bahama G-0262 | 0.25 | 20 | 1:5 | 100 | Bahama Green G-0262 | 0.6 | 40 | 1:5 | 99 |
| Maroon G-12343 | 1.0 | 40 | 1:5.2 | 100 | 50% Navy G-14465 / 50% Brittany Blue G-13360 | 0.56 | 40 | 1:5 | 100 |
| | .9 | 40 | 1:5.2 | 100 | | | | | |
| Purple G-15417 | 0.2 | 40 | 1:20 | 100 | 50% Navy / 50% Maroon | 0.95 | 40 | 1:5 / 1:5.2 | 100 |
| Chartreuse G-15463 | 0.15 | 40 | 1:20 | 100 | | | | | |
| Brittany Blue G-11360 | 0.15 | 30 | 1:5 | 100 | 50% Navy / 50% Maroon | 0.95 | 40 | 1:5 / 1:5.2 | 100 |
| Green G-15462 | 0.3 | 40 | 1:20 | 100 | 25% Navy / 25% Maroon / 25% Bahama / 25% Brittany | 0.6 | 40 | 1:5 / 1:5.2 / 1:5 / 1:5 | 100 |

Table II

[Minimum amount of Nuchar C-190-A required to clarify completely the solutions of the acid dye used in the process described in the United States Patent No. 2,249,607, as compared with the amount required for the water solutions of the same dyes.]

| Name of Dye | Conc. of Dye Percent of Solution | Conc. of Nuchar Percent of Solution | Water Solution | Acid Solution | Time of Filt. (20 cc.) | Percent of Clarification |
|---|---|---|---|---|---|---|
| | | | | | *Minutes* | |
| Wool Fast Blue GL | 0.2 | 0.6 | • | | 10 | 100 |
| | 0.2 | 0.6 | • | | 15 | 50 |
| | 0.2 | 1.2 | • | | 20 | 70 |
| | 0.2 | 2.5 | • | | 30 | 80 |
| | 0.2 | 0.6 | | • | 8 | 85 |
| Wool Fast Blue BL | 0.2 | 0.85 | | • | 9 | 100 |
| | 0.2 | 1.0 | • | | 15 | 50 |
| | 0.2 | 2.0 | • | | 25 | 75 |
| | 0.2 | 0.8 | • | | 15 | 40 |
| Azo Rubinol 3GP | 0.2 | 1.0 | • | | 25 | 45 |
| | 0.2 | 2.0 | • | | 35 | 60 |
| | 0.2 | 0.6 | | • | 10 | 100 |
| | 0.2 | 0.6 | | • | 10 | 100 |
| Alizarine Bright Green GS | 0.2 | 1.0 | • | | 15 | 50 |
| | 0.2 | 2.0 | • | | 25 | 70 |
| | 0.2 | 0.6 | | • | 10 | 100 |
| Polar Yellow 5G | 0.2 | 0.6 | • | | 15 | 50 |
| | 0.2 | 1.0 | • | | 20 | 60 |

This table shows that without the presence of acids a clear solution is not obtained even using large amounts of activated carbon and likewise in Tables III, IV and V.

Table III

[Minimum acid concentration required to clarify completely the solutions of the acid dyes used for the process described in the United States Patent No. 2,249,607]

| Name of Dye | Dye Conc. percent of Solution | Nuchar Conc. percent of Solution | Percent Acetic Acid (70 percent Conc.) | Percent $H_2SO_4$ 20° Bé. | Time in min. of filtration (20 cc.) | Percent Clarification |
|---|---|---|---|---|---|---|
| Wool Fast Blue GL | 0.2 | 1.0 | none | none | 15 | 60 |
|  | 0.2 | 1.0 | 2.0 | none | 10 | 100 |
|  | 0.2 | 1.0 | none | 2 | 10 | 100 |
| Wool Fast Blue BL | 0.2 | 1.0 | none | none | 15 | 50 |
|  | 0.2 | 1.0 | 2.0 | none | 13 | 85 |
|  | 0.2 | 1.0 | 4.0 | none | 15 | 90 |
|  | 0.2 | 1.0 | 8.0 | none | 15 | 100 |
|  | 0.2 | 1.0 | none | 2 | 10 | 100 |
| Azo Rubinol 3GP | 0.2 | 1.0 | none | none | 25 | 45 |
|  | 0.2 | 1.0 | 2.0 | none | 20 | 60 |
|  | 0.2 | 1.0 | 4.0 | none | 18 | 60 |
|  | 0.2 | 1.0 | 8.0 | none | 18 | 90 |
|  | 0.2 | 2.0 | none | none | 20 | 50 |
|  | 0.2 | 2.0 | 4.0 | none | 10 | 100 |
|  | 0.2 | 1.0 | none | 2 | 10 | 100 |
| Alizarine Bright Green GS | 0.2 | 1.0 | none | none | 15 | 50 |
|  | 0.2 | 1.0 | 2.0 | none | 15 | 100 |
|  | 0.2 | 1.0 | none | 2 | 10 | 100 |
| Polar Yellow 5G | 0.2 | 1.0 | none | none | 15 | 60 |
|  | 0.2 | 1.0 | 2.0 | none | 15 | 100 |
|  | 0.2 | 1.0 | none | 2 | 10 | 100 |

Table IV

[Minimum amounts of Nuchar C-190-A and acid necessary to clarify completely water solutions of direct dyestuffs.]

| Name of Dye | Dye Conc. percent of Solution | Nuchar Conc. percent of Solution | Percent of Acetic Acid (70 percent Conc.) | Percent $H_2SO_4$ 20° Bé. | Time in min. of filtration (20 cc.) | Percent Clarification |
|---|---|---|---|---|---|---|
| Pontamine Green GX—125% conc | 0.2 | 1.0 | none | none | 20 | 20 |
|  | 0.2 | 1.0 | 2.0 | none | 180 | 30 |
|  | 0.2 | 1.0 | 4.0 | none | 300 | 35 |
|  | 0.2 | 1.0 | 8.0 | none | 300 | 50 |
|  | 0.2 | 2.0 | none | none | 30 | 20 |
|  | 0.2 | 2.0 | 2.0 | none | 180 | 100 |
|  | 0.2 | 1.0 | none | 2 | 40 | 80 |
|  | 0.2 | 1.0 | none | 4 | 40 | 100 |
| Niagara Blue 2B | 0.2 | 1.0 | none | none | 17 | 35 |
|  | 0.2 | 1.0 | 2.0 | none | 12 | 100 |
|  | 0.2 | 1.0 | none | 2 | 10 | 100 |
| Erie Black RXXO | 0.2 | 1.0 | none | none | 16 | 25 |
|  | 0.2 | 1.0 | 2.0 | none | 15 | 100 |
|  | 0.2 | 1.0 | none | 2 | 10 | 85 |
|  | 0.2 | 1.0 | none | 4 | 10 | 100 |
| Pontamine Fast Red 8BL—125% | 0.2 | 1.0 | none | none | 19 | 30 |
|  | 0.2 | 1.0 | 2.0 | none | 15 | 35 |
|  | 0.2 | 1.0 | 4.0 | none | 13 | 40 |
| Pontamine Fast Red | 0.2 | 2.0 | none | none | 24 | 50 |
|  | 0.2 | 2.0 | 2.0 | none | 15 | 100 |
|  | 0.2 | 1.0 | none | 2 | 10 | 100 |
| Pontamine Fast Yellow NNL—175% conc | 0.2 | 1.0 | none | none | 13 | 30 |
|  | 0.2 | 1.0 | 2.0 | none | 10 | 35 |
|  | 0.2 | 1.0 | 4.0 | none | 13 | 45 |
|  | 0.2 | 2.0 | none | none | 18 | 50 |
|  | 0.2 | 2.0 | 2.0 | none | 15 | 100 |
|  | 0.2 | 1.0 | none | 2 | 10 | 85 |
|  | 0.2 | 1.0 | none | 4 | 10 | 100 |

Table V

[Minimum amounts of Nuchar C-190-A and acid necessary to clarify completely water solutions of direct acetate dyestuffs.]

| Name of Dye | Dye Conc. percent of Solution | Nuchar Conc. percent of Solution | Percent Acetic Acid (70 percent Conc.) | Percent $H_2SO_4$ 20° Bé. | Time in min. of filtration (20 cc.) | Percent Clarification |
|---|---|---|---|---|---|---|
| Eastone Red B | 0.2 | 1.0 | none | none | 15 | 50 |
|  | 0.2 | 1.0 | 2.0 | none | 5 | 100 |
|  | 0.2 | 1.0 | none | 2 | 10 | 100 |
| Eastone Rubine C | 0.2 | 1.0 | none | none | 15 | 50 |
|  | 0.2 | 1.0 | 2.0 | none | 15 | 75 |
|  | 0.2 | 1.0 | 4.0 | none | 10 | 100 |
|  | 0.2 | 1.0 | none | 2 | 10 | 100 |
| Eastman Blue BNN | 0.2 | 1.0 | none | none | 20 | 50 |
|  | 0.2 | 1.0 | 2.0 | none | 14 | 100 |
|  | 0.2 | 1.0 | none | 2 | 10 | 100 |
| Eastone Orange 3R | 0.2 | 1.0 | none | none | 15 | 30 |
|  | 0.2 | 1.0 | 2.0 | none | 15 | 45 |
|  | 0.2 | 1.0 | 4.0 | none | 15 | 50 |
|  | 0.2 | 1.0 | 8.0 | none | 15 | 75 |
|  | 0.2 | 2.0 | none | none | 23 | 60 |
|  | 0.2 | 2.0 | 2.0 | none | 23 | 100 |
|  | 0.2 | 1.0 | none | 2 | 10 | 100 |
| Eastman Black SN-NeW | 0.2 | 1.0 | none | none | 25 | 40 |
|  | 0.2 | 1.0 | 2.0 | none | 20 | 45 |
|  | 0.2 | 1.0 | 4.0 | none | 23 | 50 |
|  | 0.2 | 1.0 | 8.0 | none | 20 | 60 |
|  | 0.2 | 2.0 | none | none | 29 | 75 |
|  | 0.2 | 2.0 | 2.0 | none | 24 | 100 |
|  | 0.2 | 1.0 | none | 2 | 10 | 90 |
|  | 0.2 | 1.0 | none | 4 | 10 | 100 |

Table VI

[Minimum amount of Nuchar C-190-A necessary to clarify completely solutions of Artol dyes. These solutions, as required by the alcohol method for dyeing cellulose acetate, consist of dye, 85 parts of alcohol and 15 parts water.]

| Name of Dye | Dye conc. in percent of Solution | Nuchar conc. in percent of Solution | Time in min. for filtration (20 cc.) | Percent Clarification |
|---|---|---|---|---|
| Artol Blue GL | 0.2 | 5.0 | 30 | 95 |
|  | 0.2 | 6.0 | 20 | 100 |
| Artol Blue BL | 0.2 | 5.0 | 30 | 100 |
| Artol Green GL | 0.2 | 5.0 | 30 | 90 |
|  | 0.2 | 6.0 | 25 | 100 |
| Artol Red B | 0.2 | 5.0 | 30 | 80 |
|  | 0.2 | 6.0 | 10 | 100 |
| Artol Yellow SH | 0.2 | 5.0 | 30 | 100 |
| Artol Black B | 0.2 | 5.0 | 30 | 100 |
| Artol Scarlet ML | 0.2 | 5.0 | 30 | 100 |

Table VII

[Minimum amount of Nuchar C-190-A required to clarify completely used solutions of vat dyes]

| Name of Dye | Conc. of Dye in per cent of Original Liquor | Conc. of Nuchar per cent of Solution | Time in Minutes for filtration (20 cc.) | Per cent Clarification |
|---|---|---|---|---|
| Calcosol Pink FB | 0.5 | 1.0 | 20 | 75 |
|  | 0.5 | 1.25 | 20 | 100 |
| Ponsol Jade Green Double | 0.5 | 1.0 | 10 | 100 |
| Ponsol Direct Black 3G | 0.5 | 1.0 | 20 | 100 |
| Amenthrene Blue RCL | 0.5 | 1.0 | 20 | 100 |
| Amenthrene Navy Blue BN | 0.5 | 1.0 | 8 | 100 |
| Indenthrene Yellow 3GF | 0.5 | 1.0 | 15 | 85 |
|  | 0.5 | 1.5 | 15 | 95 |
|  | 0.5 | 2.0 | 15 | 100 |

Table IX

[Minimum amount of Nuchar C-190-A required to clarify completely solutions of sulphur dyes]

| Name of Dye | Dye Conc. percent of solution | Nuchar Conc. per-cent of solution | Time in min. for filtration (20 cc.) | Percent clarification |
|---|---|---|---|---|
| Calcogene Black GXCF | 0.1 | 1.0 | 50 | 20 |
|  | 0.1 | 2.0 | 50 | 25 |
|  | 0.1 | [1] 1.0 | 5 | 100 |
| Calcogene Red EUCF | 0.1 | 1.0 | 15 | 100 |
| Calcogene Bordeaux 6R | 0.1 | 1.0 | 15 | 100 |
| Calcogene Blue 2RCF | 0.1 | 1.0 | 10 | 90 |
|  | 0.1 | 2.0 | 15 | 100 |
| Katigen Cross Dye Green G | 0.1 | 1.0 | 20 | 95 |
|  | 0.1 | 2.0 | 15 | 100 |

[1] 2 percent Ac. Ac.

Table X

[Minimum amount of Nuchar C-190-A required to clarify completely used solutions of Naphthol Dyes, rinsings and coupling baths]

| Name of Dye | Conc. of Dye Percent of Original Solution | Nuchar Conc. Percent of Solution | Time in min. of filtration (20 cc.) | Percent Clarification |
|---|---|---|---|---|
| Naphthol AS-SW | 0.1 | 0.1 | 15 | 100 |
| Salt Rinsing |  | 0.1 | 10 | 100 |
| Fast Scarlet Salt B | 0.3 | 0.1 | 15 | 100 |
| Naphthol AS-BR | 0.1 | 0.1 | 15 | 100 |
| Salt Rinsing |  | 0.1 | 8 | 100 |
| Fast Blue Salt BB | 0.3 | 0.1 | 10 | 100 |
| Naphthol AS-GR | 0.1 | 0.1 | 12 | 100 |
| Salt Rinsing |  | 0.1 | 8 | 100 |
| Fast Blue Salt BB | 0.3 | 0.1 | 10 | 100 |

Results were obtained with carbons prepared in accordance with procedures above described, upon dye solutions containing .1% Wool Fast Blue GL, .02% Wool Fast BL, 102% Alizarine Green GHN, for 100% clarification in 15 minutes at room temperature in each case.

Table XI

| Carbon | Preparation | Composition of Dye Liquor Solvent | Per cent Carbon Required | pH of Dye Liquor |
|---|---|---|---|---|
| Peat | 1 part Peat+2 parts ZnCl₂ Charred at 500-550° C.—Washed Ground to −325 mesh. | 8⅓% 20° Bé. H₂SO₄, 8⅓% 85% HCOOH, 8⅓% 84% CH₃COOH, 75% Water. | 1.6 | .6 |
|  |  | 100% Water | 4.41 | 6.6 |
|  |  | 6% Cellosolve, 84% Water | 4.4 | 3.35 |
|  |  | 16% HCOOH, 84% Water | .77 | 1.75 |
|  |  | 8% H₂SO₄, 6% Cellosolve, 86% Water | 1.1 | 1.5 |
|  |  | 16% HCOOH, 6% Cellosolve, 78% Water | .94 | 1.05 |
|  |  | 8% H₂SO₄, 92% Water | .77 | .85 |
|  |  | 16% HCOOH, 8% H₂SO₄, 76% Water | .66 | .6 |
|  | 1 part peat, 2 parts ZnCl₂ Charred at 500-550° C. Washed ground to −325 mesh. Heated in a CO₂ Atmosphere at 950° C. for 20 minutes. | 8⅓% 20° Bé. H₂SO₄, 8⅓% 85% HCOOH, 8⅓% 84% CH₃ COOH, 75% Water. | .7 | .6 |
| Cellulose | 1 part cellulose+2 parts ZnCl₂ Charred as above Washed and ground to −325 mesh. Heated in a CO₂ Atmosphere at 1000° C. for 45 minutes. | As above | .6 | .6 |
| Lignite | 1 part lignite+2 parts ZnCl₂ Charred as above Washed. Ground to −325 mesh. Heated in a CO₂ atmosphere at 1000° C. for 45 minutes. | do | 1.0 | .6 |

Table VIII

[Minimum amount of Nuchar C-190-A required to clarify complete solutions of basic dyes.]

| Name of Dye | Dye Conc. percent of Solution | Nuchar Conc. percent of Solution | Time in Minutes for Filtration (20 cc.) | Percent Clarification |
|---|---|---|---|---|
| Rhodamine 6GDN extra | 0.2 | 1.0 | 15 | 70 |
|  | 0.2 | 2.0 | 5 | 100 |
| Methylene Blue 2B | 0.2 | 1.0 | 5 | 100 |
| Calcogene Yellow O | 0.2 | 1.0 | 20 | 80 |
|  | 0.2 | 2.0 | 5 | 100 |
| Brilliant Green B Crystals | 0.2 | 1.0 | 5 | 80 |
|  | 0.2 | 2.0 | 5 | 100 |

The foregoing specification is the specification of my application Serial No. 479,075, filed March 13, 1943, now abandoned, as filed and with additions incorporated therein by amendment, of which this application is a continuation-in-part.

The following disclosure is taken from my copending application Serial No. 534,229, filed May 5, 1944, now abandoned:

In respect of dye liquors prepared with organic solvents, such as alcohol or organic solvents of the goods which are dyed therewith, such as Cellosolve or the monoethyl ether of ethylene glycol, it is now found that a further improvement may be effected in the removal of dye and recovery of the solvent and solute reagents. It is discovered that, if such dye liquors are treated with an acid which may be an organic or inorganic acid, and even though in relatively small amounts and low concentrations, the speed and completeness of removal of the dye from the dye liquor are greatly increased. Furthermore, it is found that complete removal of the dye may be effected with a considerably reduced amount of the activated, specifically adsorbent charcoal used, whichever kind is employed of those mentioned above.

Dye liquors similarly prepared and containing other organic solvents may be recovered in a like manner, in which the solvent may comprise, for example, one or more of the following: Ethyl acetate, Cellosolve, Carbitol acetate, diacetone alcohol, dioxane, butyl Cellosolve, diethyl Cellosolve solvent, Cellosolve acetate, methyl Cellosolve acetate, phenyl Cellosolve, acetonyl acetone, dimethoxy tetraethylene glycol, ethylene chlorhydrin, glycol diformate, benzyl Cellosolve, Carbitol, methyl alcohol, ethyl alcohol, propyl alcohol and isopropyl alcohol.

These solvents are related in common by being soluble in water and by having a hydrocarbon nucleus containing a C=O group, in ester, ether or ketone structure.

I claim:

1. Method of recovering solvent and solute values from dye liquors, consisting of the steps of treating spent dye liquor with activated adsorbent carbon selected from the class consisting of lignite which has been heated to 700 to 900° C., then ground to a size that 70 to 90% will pass a 300 mesh screen, and then washed with acid and water; carbonized lignin residues obtained by carbonizing the cooking liquors derived from the treatment of wood by the alkali process to obtain wood pulp and which have been heated to expel volatile substances and to fuse the mineral substances present therein, and the fused mineral substances then removed; charcoal which has been passed between electrodes of an electric furnace, and subjected to a temperature of 3000 to 3300° F. while moving past the electrodes at a speed from ½ inch to 12 inches per hour in the presence of 1 pound to 5 pounds of steam; and carbon derived from a material selected from the group consisting of peat moss, cellulose and lignite which have been charred in the presence of zinc chloride to a temperature of 500–550° C., leached with water, and ground to 325 mesh, as well as said carbons of this last group which have been also subjected to subsequent activation by both heating, at temperatures of approximately 950° C., 1000° C. and 1000° C., respectively, and cooling in an atmosphere of carbon dioxide gas, in finely divided form and freely dispersed in and throughout the dye liquor, agitating the mixture actively and for a period of time sufficient to effect intimate contact between the activated carbon and dye liquor and complete combination of the entire dye content of the liquor with the dispersed carbon, and then separating the combined adsorbent carbon and adsorbed dye substance from the residual solvent solution of reagents, thereby leaving the latter free from all dye substance and in condition suitable for reuse as a solvent for the preparation of fresh dye liquor of any color.

2. Method of recovering solvent and solute values from acid, direct and direct acetate dye liquors, consisting of the steps of treating spent dye liquor, in acidified condition, with activated adsorbent carbon, selected from the class consisting of lignite which has been heated to 700 to 900° C., then ground to a size that 70 to 90% will pass a 300 mesh screen, and then washed with acid and water; carbonized lignin residues obtained by carbonizing the cooking liquors derived from the treatment of wood by the alkali process to obtain wood pulp and which have been heated to expel volatile substances and to fuse the mineral substances present therein, and the fused mineral substances then removed; charcoal which has been passed between electrodes of an electric furnace, and subjected to a temperature of 3000 to 3300° F. while moving past the electrodes at a speed from ½ inch to 12 inches per hour in the presence of 1 pound to 5 pounds of steam; and carbon derived from a material selected from the group consisting of peat moss, cellulose and lignite which have been charred in the presence of zinc chloride to a temperature of 500–550° C., leached with water, and ground to 325 mesh, as well as said carbons of this last group which have been also subjected to subsequent activation by both heating, at temperatures of approximately 950° C., 1000° C., and 1000° C., respectively, and cooling in an atmosphere of carbon dioxide gas, in finely divided form and freely dispersed in and throughout the dye liquor, agitating the mixture actively and for a period of time sufficient to effect intimate contact between the activated carbon and dye liquor and complete combination of the entire dye content of the liquor with the dispersed carbon, and then separating the combined adsorbent carbon and adsorbed dye substance from the residual solvent solution of reagents, thereby leaving the latter free from all dye substance and in condition suitable for re-use as a solvent for the preparation of fresh dye liquor of any color.

3. Method of recovering solvent and solute values from dye liquors, consisting of the steps of treating spent dye liquor, acidified with organic acid, with activated adsorbent carbon, selected from the class consisting of lignite which has been heated to 700 to 900° C., then ground to a size that 70 to 90% will pass a 300 mesh screen, and then washed with acid and water; carbonized lignin residues obtained by carbonizing the cooking liquors derived from the treatment of wood by the alkali process to obtain wood pulp and which have been heated to expel volatile substances and to fuse the mineral substances present therein, and the fused mineral substances then removed; charcoal which has been passed between electrodes of an electric furnace, and subjected to a temperature of 3000 to 3300° F. while moving past the electrodes at a speed from ½ inch to 12 inches per hour in the presence of 1 pound to 5 pounds of steam; and carbon derived from a material selected from the group consisting of peat moss, cellulose and lignite which have been charred in the presence of zinc chloride to a temperature of 500–550° C., leached with water, and ground to 325 mesh, as well as said carbons of this last group which have been also subjected to subsequent activation by both heating, at temperatures of approximately 950° C., 1000° C., and 1000° C., respectively, and cooling in an atmosphere of carbon dioxide gas, in finely divided form and freely dispersed in and throughout the dye liquor, agitating the mixture actively and for a period of time sufficient to effect intimate contact between the activated carbon and dye liquor and complete combination of the entire dye content of the liquor with the dispersed carbon, and then separating the combined adsorbent carbon and adsorbed dye substance from the residual solvent solution of reagents, thereby leaving the latter free from all dye substance and in condition suitable for re-use as a solvent for the preparation of fresh dye liquor of any color.

4. Method of recovering solvent and solute values from dye liquors, consisting of the steps of treating spent dye liquor, acidified with inorganic acid, with activated adsorbent carbon, selected from the class consisting of lignite which has been heated to 700 to 900° C., then ground to a size that 70 to 90% will pass a 300 mesh screen, and then washed with acid and water; carbonized lignin residues obtained by carbonizing the cooking liquors derived from the treatment of wood by the alkali process to obtain wood pulp and which have been heated to expel volatile substances and to fuse the mineral substances present therein, and the fused mineral substances then removed; charcoal which has been passed between electrodes of an electric furnace, and subjected to a temperature of 3000 to 3300° F. while moving past the electrodes at a speed from ½ inch to 12 inches per hour in the presence of 1 pound to 5 pounds of steam; and carbon derived from a material selected from the group consisting of peat moss, cellulose and lignite which have been charred in the presence of zinc chloride to a temperature of 500–550° C., leached with water, and ground to 325 mesh, as well as said carbons of this last group which have been also subjected to subsequent activation by both heating, at temperatures of approximately 950° C., 1000° C., and 1000° C., respectively, and cooling in an atmosphere of carbon dioxide gas, in finely divided form and freely dispersed in and throughout the dye liquor, agitating the mixture actively and for a period of time sufficient to effect intimate contact between the activated carbon and dye liquor and complete combination of the entire dye content of the liquor with the dispersed carbon, and then separating the combined adsorbent carbon and adsorbed dye substance from the residual solvent solution of reagents, thereby leaving the latter free from all dye substance and in condition suitable for re-use as a solvent for the preparation of fresh dye liquor of any color.

5. Method of recovering solvent and solute values from dye liquors, consisting of the steps of treating spent dye liquor, acidified with organic and inorganic acids, with activated adsorbent carbon, selected from the class consisting of lignite which has been heated to 700 to 900° C., then ground to a size that 70 to 90% will pass a 300 mesh screen, and then washed with acid and water; carbonized lignin residues obtained by carbonizing the cooking liquors derived from the treatment of wood by the alkali process to obtain wood pulp and which have been heated to expel volatile substances and to fuse the mineral substances present therein, and the fused mineral substances then removed; charcoal which has been passed between electrodes of an electric furnace, and subjected to a temperature of 3000 to 3300° F. while moving past the electrodes at a speed from ½ inch to 12 inches per hour in the presence of 1 pound to 5 pounds of steam; and carbon derived from a material selected from the group consisting of peat moss, cellulose and lignite which have been charred in the presence of zinc chloride to a temperature of 500–550° C., leached with water, and ground to 325 mesh, as well as said carbons of this last group which have been also subjected to subsequent activation by both heating, at temperatures of approximately 950° C., 1000° C., and 1000° C., respectively, and cooling in an atmosphere of carbon dioxide gas, in finely divided form and freely dispersed in and throughout the dye liquor, agitating the mixture actively and for a period of time sufficient to effect intimate contact between the activated carbon and dye liquor and complete combination of the entire dye content of the liquor with the dispersed carbon, and then separating the combined adsorbent carbon and adsorbed dye substance from the residual solvent solution of reagents, thereby leaving the latter free from all dye substance and in condition suitable for re-use as a solvent for the preparation of fresh dye liquor of any color.

6. Method of recovering solvent and solute values from dye liquors, consisting of the steps of treating spent dye liquor, in acidified condition to a pH value of about 1.0, with activated adsorbent carbon, selected from the class consisting of lignite which has been heated to 700 to 900° C., then ground to a size that 70 to 90% will pass a 300 mesh screen, and then washed with acid and water; carbonized lignin residues obtained by carbonizing the cooking liquors derived from the treatment of wood by the alkali process to obtain wood pulp and which have been heated to expel volatile substances and to fuse the mineral substances present therein, and the fused mineral substances then removed; charcoal which has been passed between electrodes of an electric furnace, and subjected to a temperature of 3000 to 3300° F. while moving past the electrodes at a speed from ½ inch to 12 inches per hour in the presence of 1 pound to 5 pounds of steam; and carbon derived from a material selected from the group consisting of peat moss, cellulose and lignite which have been charred in the presence of zinc chloride to a temperature of 500–550° C., leached with water, and ground to 325 mesh, as well as said carbons of this last group which have been also subjected to subsequent activation by both heating, at temperatures of approximately 950° C., 1000° C., and 1000° C., respectively, and cooling in an atmosphere of carbon dioxide gas, in finely divided form and freely dispersed in and throughout the dye liquor, agitating the mixture actively and for a period of time sufficient to effect intimate contact between the activated carbon and dye liquor and complete combination of the entire dye content of the liquor with the dispersed carbon, and then separating the combined adsorbent carbon and adsorbed dye substance from the residual solvent solution of reagents, thereby leaving the latter free from all dye substance and in condition suitable for re-use as a solvent for the preparation of fresh dye liquor of any color.

7. Method of recovering solvent and solute values from dye liquors, consisting of the steps of treating spent dye liquor, containing sulphuric, acetic and formic acids, with activated adsorbent carbon, selected from the class consisting of lignite which has been heated to 700 to 900° C., then ground to a size that 70 to 90% will pass a 300 mesh screen, and then washed with acid and water; carbonized lignin residues obtained by carbonizing the cooking liquors derived from the treatment of wood by the alkali process to obtain wood pulp and which have been heated to expel volatile substances and to fuse the mineral substances present therein, and the fused mineral substances then removed; charcoal which has been passed between electrodes of an electric furnace, and subjected to a temperature of 3000 to 3300° F. while moving past the electrodes at a speed from ½ inch to 12 inches per hour in the presence of 1 pound to 5 pounds of steam; and carbon derived from a material selected from the group consisting of peat moss, cellulose and lignite which have been charred in the presence of zinc chloride to a temperature of 500–550° C., leached with water, and ground to 325 mesh, as well as said carbons of this last group which have been also subjected to subsequent activation by both heating, at temperatures of approximately 950° C., 1000° C., and 1000° C., respectively, and cooling in an atmosphere of carbon dioxide gas, in finely divided form and freely dispersed in and throughout the dye liquor, agitating the mixture actively and for a period of time sufficient to effect intimate contact between the activated carbon and dye liquor and complete combination of the entire dye content of the liquor with the dispersed carbon, and then separating the combined adsorbent carbon and adsorbed dye substance from the residual solvent solution of reagents, thereby leaving the latter free from all dye substance and in condition suitable for re-use as a solvent for the preparation of fresh dye liquor of any color.

8. Method of recovering solvent and solute values from vat, basic, sulphur and naphthol dye liquors, consisting of the steps of treating spent dye liquor with activated adsorbent carbon selected from the class consisting of lignite which has been heated to 700 to 900° C., then ground to a size that 70 to 90% will pass a 300 mesh screen, and then washed with acid and water; carbonized lignin residues obtained by carbonizing the cooking liquors derived from the treatment of wood by the alkali process to obtain wood pulp and which have been heated to expel volatile substances and to fuse the mineral substances present therein, and the fused mineral substances then removed; charcoal which has been passed between electrodes of an electric furnace, and subjected to a temperature of 300 to 3300° F. while moving past the electrodes at a speed from ½ inch to 12 inches per hour in the presence of 1 pound to 5 pounds of steam; and carbon derived from a material selected from the group consisting of peat moss, cellulose and lignite which have been charred in the presence of zinc chloride to a temperature of 500–550° C., leached with water, and ground to 325 mesh, as well as said carbons of this last group which have been also subjected to subsequent activation by both heating, at temperatures of approximately 950° C., 1000° C., and 1000° C., respectively, and cooling in an atmosphere of carbon dioxide gas, in finely divided form and freely dispersed in and throughout the dye liquor, agitating the mixture actively and for a period of time sufficient to effect intimate contact between the activated carbon and dye liquor and complete combination of the entire dye content of the liquor with the dispersed carbon, and then separating the combined adsorbent carbon and adsorbed dye substance from the residual solvent solution of reagents, thereby leaving the latter free from all dye substance and in condition suitable for re-use as a solvent for the preparation of fresh dye liquor of any color.

9. Method of recovering solvent and solute values from concentrated alcohol dye liquors, consisting of the steps of treating spent dye liquor with activated adsorbent carbon, selected from the class consisting of lignite which has been heated to 700 to 900° C. then ground to a size that 70 to 90% will pass a 300 mesh screen, and then washed with acid and water; carbonized lignin residues obtained by carbonizing the cooking liquors derived from the treatment of wood by the alkali process to obtain wood pulp and which have been heated to expel volatile substances and to fuse the mineral substances present therein, and the fused mineral substances then removed; charcoal which has been passed between electrodes of an electric furnace, and subjected to a temperature of 3000 to 3300° F. while moving past the electrodes at a speed from ½ inch to 12 inches per hour in the presence of 1 pound to 5 pounds of steam; and carbon derived from a material selected from the group consisting of peat moss, cellulose and lignite which have been charred in the presence of zinc chloride to a temperature of 500–550° C., leached with water, and ground to 325 mesh, as well as said carbons of this last group which have been also subjected to subsequent activation by both heating, at temperatures of approximately 950° C., 1000° C., and 1000° C., respectively, and cooling in an atmosphere of carbon dioxide gas, in finely divided form and freely dispersed in and throughout the dye liquor, agitating the mixture actively and for a period of time sufficient to effect intimate contact between the activated carbon and dye liquor and complete combination of the entire dye content of the liquor with the dispersed carbon, and then separating the combined adsorbent carbon and adsorbed dye substance from the residual solvent solution of reagents, thereby leaving the latter free from all dye substance and in condition suitable for re-use as a solvent for the preparation of fresh dye liquor of any color.

10. Method of recovering solvent and solute values from mixtures of dye liquors, consisting of the steps of treating spent dye liquor with activated adsorbent carbon, selected from the class consisting of lignite which has been heated to 700 to 900° C., then ground to a size that 70 to 90% will pass a 300 mesh screen, and then washed with acid and water; carbonized lignin residues obtained by carbonizing the cooking liquors derived from the treatment of wood by the alkali process to obtain wood pulp and which have been heated to expel volatile substances and to fuse the mineral substances present therein, and the fused mineral substances then removed; charcoal which has been passed between electrodes of an electric furnace, and subjected to a temperature of 3000 to 3300° F. while moving past the electrodes at a speed from ½ inch to 12 inches per hour in the presence of 1 pound to 5 pounds of steam; and carbon derived from a material selected from the group consisting of peat moss, cellulose and lignite which have been charred in the presence of zinc chloride to a temperature of 500–550° C., leached with water, and ground to 325 mesh, as well as said carbons of this last group which have been also subjected to subsequent activation by both heating, at temperatures of approximately 950° C., 1000° C., and 1000° C., respectively, and cooling in an atmosphere of carbon dioxide gas, in finely divided form and freely dispersed in and throughout the dye liquor, agitating the mixture actively and for a period of time sufficient to effect intimate contact between the activated carbon and dye liquor and complete combination of the entire dye content of the liquor with the dispersed carbon, and then separating the combined adsorbent carbon and adsorbed dye substance from the residual solvent solution of reagents, thereby leaving the latter free from all dye substance and in condition suitable for re-use as a solvent for the preparation of fresh dye liquor of any color.

11. Method of recovering solvent and solute values from dye liquors, consisting of the steps of treating spent dye liquor with activated adsorbent carbon which is carbonized lignin residue obtained by carbonizing the cooking liquors derived from the treatment of wood by the alkali process to obtain wood pulp and heating to expel volatile substances and fuse the mineral substances present therein and removing the fused mineral substances, in finely divided form and freely dispersed in and throughout the dye liquor, agitating the mixture actively and for a period of time sufficient to effect intimate contact between the activated carbon and dye liquor and complete combination of the entire dye content of the liquor with the dispersed carbon, and then separating the combined adsorbent carbon and adsorbed dye substance from the residual solvent solution of reagents, thereby leaving the latter free from all dye substance and in condition suitable for re-use as a solvent for the preparation of fresh dye liquor of any color.

12. Method of recovering solvent and solute values from mixtures of dye liquors, consisting of the steps of treating spent dye liquor with activated adsorbent carbon obtained from charcoal which has been passed between electrodes of an electric furnace and subjected to a temperature of 3000 to 3300° F. while moving past the electrodes at a speed from ½ inch to 12 inches per hour in the presence of 1 pound to 5 pounds of steam; in finely divided form and freely dispersed in and throughout the dye liquor, agitating the mixture actively and for a period of time sufficient to effect intimate contact between the activated carbon and dye liquor and complete combination of the entire dye content of the liquor with the dispersed carbon, and then separating the combined adsorbent carbon and adsorbed dye substance from the residual solvent solution of reagents, thereby leaving the latter free from all dye substance and in condition suitable for re-use as a solvent for the preparation of fresh dye liquor of any color.

13. Method of recovering solvent and solute values from dye liquors, consisting of the steps of treating spent dye liquor with activated adsorbent carbon, selected from the class consisting of lignite which has been heated to 700 to 900° C., then ground to a size that 70 to 90% will pass a 300 mesh screen, and then washed with acid and water; carbonized lignin residues obtained by carbonizing the cooking liquors derived from the treatment of wood by the alkali process to obtain wood pulp and which have been heated to expel volatile substances and to fuse the mineral substances present therein, and the fused mineral substances then removed; charcoal which has been passed between electrodes of an electric furnace, and subjected to a temperature of 3000 to 3300° F. while moving past the electrodes at a speed from ½ inch to 12 inches per hour in the presence of 1 pound to 5 pounds of steam; and carbon derived from a material selected from the group consisting of peat moss, cellulose and lignite which have been charred in the presence of zinc chloride to a temperature of 500–550° C., leached with water, and ground to 325 mesh, as well as said carbons of this last group which have been also subjected to subsequent activation by both heating, at temperatures of approximately 950° C., 1000° C., and 1000° C., respectively, and cooling in an atmosphere of carbon dioxide gas, in the proportion of approximately from one-third to twelve times the concentration of the dye substance to be removed, in finely divided form and freely dispersed in and throughout the dye liquor, agitating the mixture actively and for a period of time, not over approximately 40 minutes, to effect intimate contact between the activated carbon and the dye liquor and complete combination of the entire dye content of the liquor with the dispersed carbon, and then separating the combined adsorbent carbon and adsorbed dye substance from the residual solvent solution, thereby leaving the latter free from all dye substance and in condition suitable for re-use as a solvent for the preparation of fresh dye liquor of any color.

14. Method of recovering solvent and solute values from dye liquors consisting of the steps of treating spent dye liquor with an activated adsorbent carbon which is derived from a material selected from the group consisting of peat moss, cellulose and lignite, by charring in the presence of zinc chloride to a temperature of 500–550° C., leaching with water and grinding to 325 mesh, in finely divided form and freely dispersed in and throughout the dye liquor, agitating the mixture actively and for a period of time sufficient to effect intimate contact between the activated carbon and dye liquor and complete combination of the entire dye content of the liquor with the dispersed carbon, and then separating the combined adsorbent carbon and adsorbed dye substance from the residual solvent solution of reagents, thereby leaving the latter free from all dye substance and in condition suitable for re-use as a solvent for the preparation of fresh dye liquor of any color.

15. Method of recovering solvent and solute values from dye liquors consisting of the steps of treating spent dye liquor with an activated adsorbent carbon which is derived from a material selected from the group consisting of peat moss, cellulose and lignite, by charring in the presence of zinc chloride to a temperature of 500–550° C., leaching with water and grinding to 325 mesh followed by subjecting to subsequent activation by both heating, at temperatures of approximately 950° C., 1000° C., and 1000° C., respectively, and then cooling in an atmosphere of carbon dioxide gas, in finely divided form and freely dispersed in and throughout the dye liquor, agitating the mixture actively and for a period of time sufficient to effect intimate contact between the activated carbon and dye liquor and complete combination of the entire dye content of the liquor with the dispersed carbon, and then separating the combined adsorbent carbon and adsorbed dye substance from the residual solvent solution of reagents, thereby leaving the latter free from all dye substance and in condition suitable for re-use as a solvent for the preparation of fresh dye liquor of any color.

16. As a recovery by-product of finely divided activated adsorbent carbon, selected from the class consisting of lignite which has been heated to 700 to 900° C., then ground to a size that 70 to 90% will pass a 300 mesh screen, and then washed with acid and water; carbonized lignin residues obtained by carbonizing the cooking liquors derived from the treatment of wood by the alkali process to obtain wood pulp and which have been heated to expel volatile substances and to fuse the mineral substances present therein, and the fused mineral substances then removed; charcoal which has been passed between electrodes of an electric furnace, and subjected to a temperature of 3000 to 3300° F. while moving past the electrodes at a speed from ½ inch to 12 inches per hour in the presence of 1 pound to 5 pounds of steam; and carbon derived from a material selected from the group consisting of peat moss, cellulose and lignite which have been charred in the presence of zinc chloride to a temperature of 500–550° C., leached with water, and ground to 325 mesh, as well as said carbons of this last group which have been also subjected to subsequent activation by both heating, at temperatures of approximately 950° C., 1000° C., and 1000° C., respectively, and cooling in an atmosphere of carbon dioxide gas, characterized by containing an unaltered dye substance in adsorbed combination therewith, said recovery by-product being obtained from spent dye liquor wherein the dye liquor in which finely divided carbon is dispersed is agitated for a period of time sufficient to effect intimate contact between the carbon and dye liquor and combination of the dye content of the liquor with the carbon, and the combined adsorbent carbon and adsorbed dye substance thereafter removed.

17. As a recovery by-product a finely divided activated adsorbent carbon, selected from the class consisting of lignite which has been heated to 700 to 900° C., then ground to a size that 70 to 90% will pass a 300 mesh screen, and then washed with acid and water; carbonized lignin residues obtained by carbonizing the cooking liquors derived from the treatment of wood by the alkali process to obtain wood pulp and which have been heated to expel volatile substances and to fuse the mineral substances present therein, and the fused mineral substances then removed; charcoal which has been passed between electrodes of an electric furnace, and subjected to a temperature of 3000 to 3300° F. while moving past the electrodes at a speed from ½ inch to 12 inches per hour in the presence of 1 pound to 5 pounds of steam; and carbon derived from a material selected from the group consisting of peat moss, cellulose and lignite which have been charred in the presence of zinc chloride to a temperature of 500–550° C., leached with water, and ground to 325 mesh, as well as said carbons of this last group which have been also subjected to subsequent activation by both heating, at temperatures of approximately 950° C., 1000° C., and 1000° C., respectively, and cooling in an atmosphere of carbon dioxide gas, characterized by containing an unaltered dye substance in acid adsorbed combination therewith of the class consisting of acid dyes, direct dyes and direct acetate dyes, said recovery by-product being obtained from spent dye liquor wherein the dye liquor in which finely divided carbon is dispersed is agitated for a period of time sufficient to effect intimate contact between the carbon and dye liquor and combination of the dye content of the liquor with the carbon, and the combined adsorbent carbon and adsorbed dye substance thereafter removed.

18. As a recovery by-product a finely divided activated adsorbent carbon, selected from the class consisting of lignite which has been heated to 700 to 900° C., then ground to a size that 70 to 90% will pass a 300 mesh screen, and then washed with acid and water; carbonized lignin residues obtained by carbonizing the cooking liquors derived from the treatment of wood by the alkali process to obtain wood pulp and which have been heated to expel volatile substances and to fuse the mineral substances present therein, and the fused mineral substances then removed; charcoal which has been passed between electrodes of an electric furnace, and subjected to a temperature of 3000 to 3300° F. while moving past the electrodes at a speed from ½ inch to 12 inches per hour in the presence of 1 pound to 5 pounds of steam; and carbon derived from a material selected from the group consisting of peat moss, cellulose and lignite which have been charred in the presence of zinc chloride to a temperature of 500–550° C., leached with water, and ground to 325 mesh, as well as said carbons of this last group which have been also subjected to subsequent activation by both heating, at temperatures of approximately 950° C., 1000° C., and 1000° C., respectively, and cooling in an atmosphere of carbon dioxide gas, characterized by containing an unaltered dye substance in alkaline adsorbed combination therewith of the class consisting of vat dyes, basic dyes, sulphur dyes and naphthol dyes, said recovery by-product being obtained from spent dye liquor wherein the dye liquor in which finely divided carbon is dispersed is agitated for a period of time sufficient to effect intimate contact between the carbon and dye liquor and combination of the dye content of the liquor with the carbon, and the combined adsorbent carbon and adsorbed dye substance thereafter removed.

19. As a recovery by-product a finely divided activated adsorbent carbon, selected from the class consisting of lignite which has been heated to 700 to 900° C., then ground to a size that 70 to 90% will pass a 300 mesh screen, and then washed with acid and water; carbonized lignin residues obtained by carbonizing the cooking liquors derived from the treatment of wood by the alkali process to obtain wood pulp and which have been heated to expel volatile substances and to fuse the mineral substances present therein, and the fused mineral substances then removed; charcoal which has been passed between electrodes of an electric furnace, and subjected to a temperature of 3000 to 3300° F. while moving past the electrodes at a speed of ½ inch to 12 inches per hour in the presence of 1 pound to 5 pounds of steam; and carbon derived from a material selected from the group consisting of peat moss, cellulose and lignite which have been charred in the presence of zinc chloride to a temperature of 500–550° C., leached with water, and ground to 325 mesh, as well as said carbons of this last group which have been also subjected to subsequent activation by both heating, at temperatures of approximately 950° C., 1000° C., and 1000° C., respectively, and cooling in an atmosphere of carbon dioxide gas, characterized by containing an unaltered dye substance in alcohol adsorbed combination therewith of the class consisting of the concentrated alcohol dyes, said recovery by-product being obtained from spent dye liquor wherein the dye liquor in which finely divided carbon is dispersed is agitated for a period of time sufficient to effect intimate contact between the carbon and dye liquor and combination of the dye content of the liquor with the carbon, and the combined adsorbent carbon and adsorbed dye substance thereafter removed.

20. As a recovery by-product a finely divided activated adsorbent carbon derived from a material selected from the group consisting of peat moss, cellulose and lignite by charring in the presence of zinc chloride to a temperature of 500–550° C., leaching with water and grinding to 325 mesh, characterized by containing an unaltered dye substance in adsorbed combination therewith, said recovery by-product being obtained from spent dye liquor wherein the dye liquor in which finely divided carbon is dispersed is agitated for a period of time sufficient to effect intimate contact between the carbon and dye liquor and combination of the dye content of the liquor with the carbon, and the combined adsorbent carbon and adsorbed dye substance thereafter removed.

21. As a recovery by-product a finely divided activated adsorbent carbon derived from a material selected from the group consisting of peat moss, cellulose and lignite by charring in the presence of zinc chloride to a temperature of 500–550° C., leaching with water and grinding to 325 mesh, followed by subjecting to subsequent activation by both heating, at temperatures of approximately 950° C., 1000° C., and 1000° C., respectively, and then cooling in an atmosphere of carbon dioxide gas, characterized by containing an unaltered dye substance in adsorbed combination therewith, said recovery by-product being obtained from spent dye liquor wherein the dye liquor in which finely divided carbon is dispersed is agitated for a period of time sufficient to effect intimate contact between the carbon and dye liquor and combination of the dye content of the liquor with the carbon, and the combined adsorbent carbon and adsorbed dye substance thereafter removed.

22. Method of recovering solvent and solute values from dye liquors consisting of treating a dye liquor containing an organic solvent, miscible with water and a solvent for the dye, with an acid and with an activated adsorbent carbon selected from the class consisting of lignite which has been heated to 700 to 900° C., then ground to a size that 70 to 90% will pass a 300 mesh screen, and then washed with acid and water; carbonized lignin residues obtained by carbonizing the cooking liquors derived from the treatment of wood by the alkali process to obtain wood pulp and which have been heated to expel volatile substances and to fuse the mineral substances present therein, and the fused mineral substances then removed; charcoal which has been passed between electrodes of an electric furnace and subjected to a temperature of 3000 to 3300° F. while moving past the electrodes at a speed from ½ inch to 12 inches per hour and in the presence of 1 pound to 5 pounds of steam; and carbon derived from a material selected from the group consisting of peat moss, cellulose and lignite which have been charred in the presence of zinc chloride to a temperature of 500–550° C., leached with water, and ground to 325 mesh, as well as said carbons of this last group which have been also subjected to subsequent activation by both heating, at temperatures of approximately 950° C., 1000° C., and 1000° C., respectively, and cooling in an atmosphere of carbon dioxide gas, in finely divided form and freely dispersed in and throughout the dye liquor, agitating the mixture actively and for a period of time sufficient to effect intimate contact between the activated carbon and dye liquor and complete combination of the entire dye content of the liquor with the dispersed carbon, and then separating the combined adsorbent carbon and adsorbed dye substance from the residual solvent solution of reagents, thereby leaving the latter free from all dye substance and in condition suitable for re-use as a solvent for the preparation of fresh dye liquor of any color.

23. Method of recovering solvent and solute values from dye liquors consisting of treating a dye liquor containing an organic solvent, miscible with water and a solvent for the dye, and characterized by having a hydrocarbon nucleus containing a C=0 group, with an acid and with an activated adsorbent carbon selected from the class consisting of lignite which has been heated to 700 to 900° C., then ground to a size that 70 to 90% will pass a 300 mesh screen, and then washed with acid and water; carbonized lignin residues obtained by carbonizing the cooking liquors derived from the treatment of wood by the alkali process to obtain wood pulp and which have been heated to expel volatile substances and to fuse the mineral substances present therein, and the fused mineral substances then removed; charcoal which has been passed between electrodes of an electric furnace and subjected to a temperature of 3000 to 3300° F. while moving past the electrodes at a speed from ½ inch to 12 inches per hour and in the presence of 1 pound to 5 pounds of steam; and carbon derived from a material selected from the group consisting of peat moss, cellulose and lignite which have been charred in the presence of zinc chloride to a temperature of 500–550° C., leached with water, and ground to 325 mesh, as well as said carbons of this last group which have been also subjected to subsequent activation by both heating, at temperatures of approximately 950° C., 1000° C., and 1000° C., respectively, and cooling in an atmosphere of carbon dioxide gas, in finely divided form and freely dispersed in and throughout the dye liquor, agitating the mixture actively and for a period of time sufficient to effect intimate contact between the activated carbon and dye liquor and complete combination of the entire dye content of the liquor with the dispersed carbon, and then separating the combined adsorbent carbon and adsorbed dye substance from the residual solvent solution of reagents, thereby leaving the latter free from all dye substance and in condition suitable for re-use as a solvent for the preparation of fresh dye liquor of any color.

24. Method of recovering solvent and solute values from dye liquors consisting of treating a dye liquor containing an organic solvent, miscible with water and a solvent for the dye, and characterized by having an OH group in its molecular structure, with an acid and with an activated adsorbent carbon selected from the class consisting of lignite which has been heated to 700 to 900° C., then ground to a size that 70 to 90% will pass a 300 mesh screen, and then washed with acid and water; carbonized lignin residues obtained by carbonizing the cooking liquors derived from the treatment of wood by the alkali process to obtain wood pulp and which have been heated to expel volatile substances and to fuse the mineral substances present therein, and the fused mineral substances then removed; charcoal which has been passed between electrodes of an electric furnace and subjected to a temperature of 3000 to 3300° F. while moving past the electrodes at a speed from ½ inch to 12 inches per hour and in the presence of 1 pound to 5 pounds of steam; and carbon derived from a material selected from the group consisting of peat moss, cellulose and lignite which have been charred in the presence of zinc chloride to a temperature of 500-550° C., leached with water, and ground to 325 mesh, as well as said carbons of this last group which have been also subjected to subsequent activation by both heating, at temperatures of approximately 950° C., 1000° C., and 1000° C., respectively, and cooling in an atmosphere of carbon dioxide gas, in finely divided form and freely dispersed in and throughout the dye liquor, agitating the mixture actively and for a period of time sufficient to effect intimate contact between the activated carbon and dye liquor and complete combination of the entire dye content of the liquor with the dispersed carbon, and then separating the combined adsorbent carbon and adsorbed dye substance from the residual solvent solution of reagents, thereby leaving the latter free from all dye substance and in condition suitable for re-use as a solvent for the preparation of fresh dye liquor of any color.

25. Method of recovering solvent and solute values from dye liquors consisting of treating a dye liquor containing an organic solvent, miscible with water and a solvent for the dye, and characterized by having a hydrocarbon nucleus containing a C=0 group, in an ester structure, with an acid and with an activated adsorbent carbon selected from the class consisting of lignite which has been heated to 700 to 900° C., then ground to a size that 70 to 90% will pass a 300 mesh screen, and then washed with acid and water; carbonized lignin residues obtained by carbonizing the cooking liquors derived from the treatment of wood by the alkali process to obtain wood pulp and which have been heated to expel volatile substances and to fuse the mineral substances present therein, and the fused mineral subtances then removed; charcoal which has been passed between electrodes of an electric furnace and subjected to a temperature of 3000 to 3300° F. while moving past the electrodes at a speed from ½ inch to 12 inches per hour and in the presence of 1 pound to 5 pounds of steam; and carbon derived from a material selected from the group consisting of peat moss, cellulose and lignite which have been charred in the presence of zinc chloride to a temperature of 500-550° C., leached with water, and ground to 325 mesh, as well as said carbons of this last group which have been also subjected to subsequent activation by both heating, at temperatures of approximately 950° C., 1000° C., and 1000° C., respectively, and cooling in an atmosphere of carbon dioxide gas, in finely divided form and freely dispersed in and throughout the dye liquor, agitating the mixture actively and for a period of time sufficient to effect intimate contact between the activated carbon and dye liquor and complete combination of the entire dye content of the liquor with the dispersed carbon, and then separating the combined adsorbent carbon and adsorbed dye substance from the residual solvent solution of reagents, thereby leaving the latter free from all dye substance and in condition suitable for re-use as a solvent for the preparation of fresh dye liquor of any color.

LUIGI C. GALATIOTO.

REFERENCES CITED

The following references are of record in the file of this patent:

UNITED STATES PATENTS

| Number | Name | Date |
| --- | --- | --- |
| 1,337,673 | Wall | Apr. 20, 1920 |
| 1,539,775 | Sauer | May 26, 1925 |
| 1,683,731 | Schwab | Sept. 11, 1928 |
| 1,747,175 | Mahler | Feb. 18, 1930 |
| 1,782,850 | Hill | Nov. 25, 1930 |
| 1,866,417 | Mackert | July 5, 1932 |
| 1,966,279 | Behrman | July 10, 1934 |
| 1,993,761 | Tippins | Mar. 12, 1935 |
| 2,055,475 | Behrman | Sept. 29, 1936 |
| 2,055,685 | Flett | Sept. 29, 1936 |
| 2,055,686 | Conrad | Sept. 29, 1936 |
| 2,062,075 | Wallerstein | Nov. 24, 1936 |
| 2,107,765 | Rodman | Feb. 8, 1938 |
| 2,224,061 | Pechukas | Dec. 3, 1940 |
| 2,225,875 | Buxton | Sept. 16, 1941 |
| 2,305,657 | Aehnelt | Dec. 22, 1942 |
| 2,306,776 | Buxton | Dec. 29, 1942 |

FOREIGN PATENTS

| Number | Country | Date |
| --- | --- | --- |
| 305,657 | Great Britain | Mar. 6, 1930 |